(12) United States Patent
Patel et al.

(10) Patent No.: US 10,729,156 B2
(45) Date of Patent: Aug. 4, 2020

(54) METHODS OF PURIFYING EXOSOMES

(71) Applicant: Purina Animal Nutrition LLC, Shoreview, MN (US)

(72) Inventors: Hasmukh Ambalal Patel, Plymouth, MN (US); Samantha Steelman, Champaign, IL (US); Ravin Gnanasambandam, Chaska, MN (US); Benjamin R. Trible, New Haven, MO (US); Nathan Christopher Burke, Inver Grove Heights, MN (US)

(73) Assignee: PURINA ANIMAL NUTRITION LLC, Arden Hills, MN (US)

( * ) Notice: Subject to any disclaimer, the term of this patent is extended or adjusted under 35 U.S.C. 154(b) by 64 days.

(21) Appl. No.: 16/198,097

(22) Filed: Nov. 21, 2018

(65) Prior Publication Data
US 2019/0150474 A1    May 23, 2019

Related U.S. Application Data

(60) Provisional application No. 62/589,058, filed on Nov. 21, 2017.

(51) Int. Cl.
*A23J 1/20* (2006.01)
*A23C 9/142* (2006.01)
(Continued)

(52) U.S. Cl.
CPC ............ *A23J 1/205* (2013.01); *A23C 1/00* (2013.01); *A23C 1/04* (2013.01); *A23C 9/1422* (2013.01);
(Continued)

(58) Field of Classification Search
CPC ........... A23J 1/20; A23J 1/205; A23C 9/1422; A23C 9/1425; A23C 9/1524; A23C 1/00;
(Continued)

(56) References Cited

U.S. PATENT DOCUMENTS 6,440,222 B1 *  8/2002  Donovan ............ B01D 61/142
                                                      127/43
6,812,023 B1   11/2004  Lamparski et al.
(Continued)

FOREIGN PATENT DOCUMENTS

EP          3192518 A1    7/2017
WO       2017117585 A1    7/2017

OTHER PUBLICATIONS

PCT, "International Search Report and Written Opinion", Patent Application No. PCT/US2018/062248, dated Feb. 27, 2019, 11 pages.

*Primary Examiner* — John Kim
(74) *Attorney, Agent, or Firm* — Dorsey & Whitney LLP

(57) ABSTRACT

Exosome purification methods involve use of a whey composition as an exosome source. Exosomes are isolated by subjecting the whey composition to a first ultrafiltration, which yields a first permeate and a first retentate. The first retentate may then be subjected to a second ultrafiltration, yielding a second permeate and a second retentate. During the second ultrafiltration, the first retentate may be treated with carbon dioxide. The second retentate may then be subjected to a third ultrafiltration, yielding a third permeate and a third retentate. The third permeate may then be optionally dried to yield an exosome powder.

20 Claims, 9 Drawing Sheets

100

110 Subjecting a whey composition to a first ultrafiltration, yielding a first permeate and a first retentate 112 Subjecting the first retentate to a second ultrafiltration, yielding a second permeate and a second retentate 114 During the second ultrafiltration, treating the first retentate with carbon dioxide 116 Subjecting the second retentate to a third ultrafiltration, yielding a third permeate and a third retentate 118 Drying the third permeate and/or the third retentate to yield an exosome powder.

(51) Int. Cl.
  *A23C 1/00*    (2006.01)
  *B01D 61/14*   (2006.01)
  *B01D 61/18*   (2006.01)
  *B01D 61/20*   (2006.01)
  *A23C 1/04*    (2006.01)
  *A23C 9/152*   (2006.01)

(52) U.S. Cl.
  CPC .......... *A23C 9/1425* (2013.01); *A23C 9/1524* (2013.01); *A23J 1/20* (2013.01); *B01D 61/142* (2013.01); *B01D 61/18* (2013.01); *B01D 61/20* (2013.01)

(58) Field of Classification Search
  CPC ........ A23C 1/04; B01D 61/142; B01D 61/18; B01D 61/20
  See application file for complete search history.

(56) References Cited

U.S. PATENT DOCUMENTS

| | | | |
|---|---|---|---|
| 6,899,863 B1 | 5/2005 | Dhellin et al. | |
| 2013/0287892 A1* | 10/2013 | Knights | A23C 1/14 426/42 |
| 2015/0173396 A1* | 6/2015 | Gardiner | A23C 19/05 514/5.7 |
| 2017/0000144 A1* | 1/2017 | Metzger | A23C 1/16 |
| 2018/0000104 A1* | 1/2018 | Clark | A23C 9/1522 |
| 2018/0343880 A1* | 12/2018 | Metzger | A23C 9/1524 |

\* cited by examiner

METHODS OF PURIFYING EXOSOMES

CROSS-REFERENCE TO RELATED APPLICATION

This application claims priority to U.S. Provisional Application No. 62/589,058, filed Nov. 21, 2017 and entitled "METHODS OF PURIFYING EXOSOMES," the entirety of which is hereby incorporated by reference for all purposes.

TECHNICAL FIELD

The present disclosure relates to exosome purification methods. Implementations utilize whey as an exosome source and selective membrane filtration as an exosome purification technique.

BACKGROUND

Exosomes are naturally occurring nanoparticles or microvesicles secreted by various cell types that may provide health benefits in various product formulations. Exosomes can also be loaded with specialized cargo, e.g., pharmaceutical compounds, and customized to deliver the cargo to targeted cell types. When used in this manner, exosomes can serve as effective delivery vesicles employed to combat various diseases.

In light of the customizability and versatility of exosomes, methods of obtaining them efficiently are beneficial and highly sought. Preexisting techniques of exosome purification commonly involve centrifugation, often at high speeds, or size exclusion chromatography (SEC). Ultracentrifugation, in particular, is typically employed to isolate exosomes from a variety of bodily fluids as well as tissue culture supernatant. Additional exosome purification methods may be desirable to expand the number of exosome sources that may be utilized without compromising the purity and yield of the final exosome product.

SUMMARY

Implementations provide approaches to purifying exosomes using a whey composition as an exosome source. One or more selective ultrafiltration and/or microfiltration steps may be implemented, accompanied by carbon dioxide treatment and optional drying.

In accordance with some examples of the present disclosure, a method of purifying exosomes may involve subjecting a whey composition to a first ultrafiltration, where the first ultrafiltration yields a first permeate and a first retentate. The method can further involve subjecting the first retentate to a second ultrafiltration, where the second ultrafiltration yields a second permeate and a second retentate. During the second ultrafiltration, the first retentate may be treated with carbon dioxide. The method can further involve subjecting the second retentate to a third ultrafiltration, where the third ultrafiltration yields a third permeate and a third retentate. The method can also involve drying the third permeate to yield an exosome powder.

In some examples, the method further involves, during the third ultrafiltration, treating the second retentate with carbon dioxide. In some embodiments, the method further involves, prior to subjecting the whey composition to a first ultrafiltration, isolating the whey composition from a milk product. In some examples, isolating the whey composition from a milk product comprises separating the milk product into cream and skim milk; acidifying the skim milk; and separating the whey composition from the acidified skim milk. In some embodiments, the milk product comprises whole milk or reduced fat milk.

In some examples, the first retentate comprises about 34 wt % to about 90 wt % protein. In some embodiments, the first ultrafiltration is performed using a first filtration membrane configured to retain molecules having a molecular weight greater than about 10 kDa (kilodaltons). In some examples, the second ultrafiltration is performed at a temperature of about 45 to about 180° F., a pressure of about 60 psi, and a flow rate of about 2 gallons per minute. In some embodiments, the third ultrafiltration is performed at a temperature of about 110° F., a pressure of about 60 psi, and a flow rate of about 2 gallons per minute. In some examples, the second ultrafiltration is performed using a second filtration membrane configured to retain molecules having a molecular weight greater than about 50 kDa. In some embodiments, the third ultrafiltration is performed using a third filtration membrane configured to retain molecules having a molecular weight greater than about 100 kDa. In some examples, the third permeate comprises molecules having a molecular weight of about 50 kDa to about 100 kDa.

In some embodiments, the second retentate comprises fat, high molecular weight proteins, and exosomes. In some examples, the third permeate comprises a concentrated exosome solution, and drying comprises spray drying. In some embodiments, treating the first retentate with carbon dioxide comprises injecting the carbon dioxide into a tank containing the first retentate. In some examples, the first retentate drops to a pH of about 5.7 as a result of treating the first retentate with carbon dioxide.

In accordance with some examples of the present disclosure, a system for purifying exosomes may include a first ultrafiltration apparatus configured to subject a whey composition to a first ultrafiltration, where the first ultrafiltration yields a first permeate and a first retentate. The system may further include a second ultrafiltration apparatus configured to subject the first retentate to a second ultrafiltration, where the second ultrafiltration yields a second permeate and a second retentate. The system may further include a carbon dioxide injector coupled with the second ultrafiltration apparatus, the carbon dioxide injector configured to inject carbon dioxide into the second ultrafiltration apparatus. The system may further include a third ultrafiltration apparatus configured to subject the second retentate to a third ultrafiltration, where the third ultrafiltration yields a third permeate and a third retentate, where the third permeate comprises an exosome solution. The system may further include a second carbon dioxide injector coupled with the third ultrafiltration apparatus, the second carbon dioxide injector configured to inject carbon dioxide into the third ultrafiltration apparatus. The system may further include a drying apparatus configured to dry the third permeate to yield an exosome powder from the exosome solution.

In some examples, the first membrane is configured to retain molecules having a molecular weight greater than about 10 kDa. In some embodiments, the second membrane is configured to retain molecules having a molecular weight greater than about 50 kDa. In some examples, the third membrane is configured to retain molecules having a molecular weight greater than about 100 kDa.

DETAILED DESCRIPTION

Implementations provide systems and methods of purifying exosomes via sequential and selective membrane filtrations of a starting material comprised of a whey composition or other milk fraction obtained from mammalian milk from a variety of mammalian species, e.g., ruminants (e.g., cows, goats, deer, elk, moose), horses, camels, humans, rabbits. In some embodiments, the whey may be derived from a milk product that has been separated into its constituent parts. While the present disclosure provides implementations for purifying exosomes from a whey composition, it will be understood that exosome sources can be purified from dairy sources such as milk, milk powder, whey concentrate or any other dairy streams.

Unlike preexisting methods of purifying exosomes, the methods described herein may not involve centrifugation and may not rely on cell cultures as an exosome source. In embodiments, exosome production methods may be scaled up to produce large, e.g., commercial, amounts of purified exosomes, which may be more concentrated than exosome products produced according to pre-existing methods.

Membrane separation or fractionation technologies employed herein may include microfiltration, ultrafiltration, diafiltration, nanofiltration, reverse and/or forward osmosis, either individually or in combination, and optionally with any of the technologies described herein. Various types of specialized membranes can be used, including charged membranes, e.g., membranes with cationic and/or anionic surfaces, hydrophobic and/or hydrophilic surfaces, or membranes containing ligands such as ion-exchange or cross-linked membranes. Various types of membranes may be used, including spiral membranes, which may be comprised of ceramic material, sheet membranes comprised of polymeric material, disk membranes comprised of metal material, and/or hollow membranes comprised of fiber.

Figure 1:
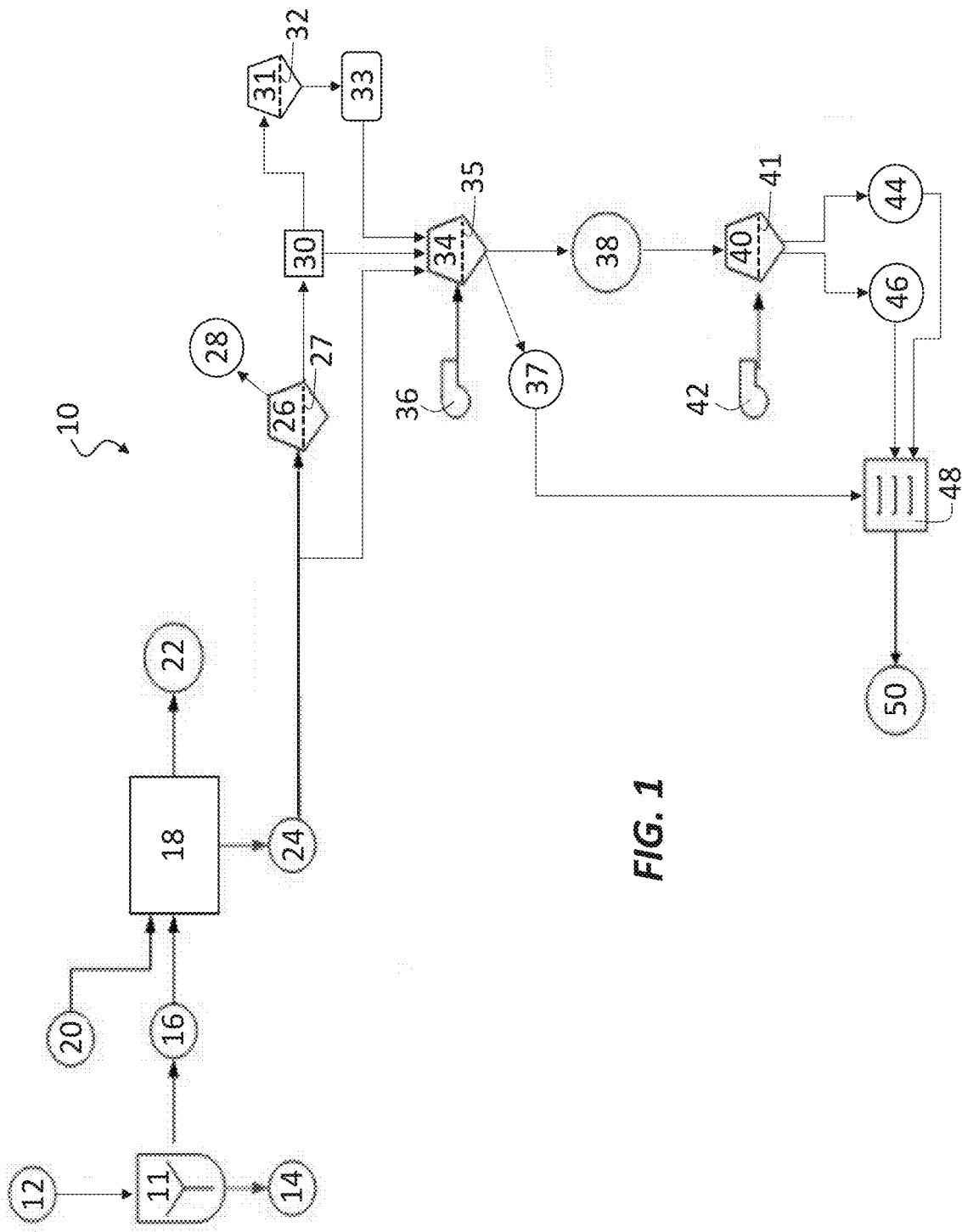
FIG. 1 is a block diagram of an exosome purification system in accordance with principles of the present disclosure.

FIG. 1 shows an example exosome purification system 10 according to principles of the present disclosure. As shown, the purification system 10 may include a separator 11 configured to receive and separate a milk product 12 into cream 14 and skim milk 16. The skim milk 16 can be added to an acidification tank or vat 18 configured to receive an acidifying agent 20. The acidification vat 18 can be used to treat the skim milk 16 with the acidifying agent 20, which can produce an aggregate material 22 used to produce cheese and a whey composition 24. Optionally, the whey composition 24 can be pre-treated by passing it through a first ultrafiltration apparatus 26, which includes at least one filtration membrane 27. Ultrafiltration of the whey composition 24 may yield a permeate 28 and a concentrated retentate 30. The retentate 30 may be passed through a microfiltration apparatus 31, which contains a microfiltration membrane 32, thereby yielding a microfiltration permeate 33 that can be passed through a second ultrafiltration apparatus 34, which includes at least one ultrafiltration membrane 35, and which may be coupled with a carbon dioxide injector 36. In some examples, the retentate 30 may be passed directly through the second ultrafiltration apparatus 34 without first passing through the microfiltration apparatus 31. Ultrafiltration in the second ultrafiltration apparatus 34, which can occur simultaneously with carbon dioxide treatment, can yield a second permeate 37 and a second retentate 38. In some examples, the second permeate 37 can be passed directly to a drying apparatus 48. The second retentate 38 can be collected and subjected to a third ultrafiltration in a third ultrafiltration apparatus 40, with at least one filtration membrane 41, which may be coupled with a second carbon dioxide injector 42, yielding a third retentate 44 and a third permeate 46. The third retentate 44 and third permeate 46 can each include an exosome solution, which may be collected and dried in the drying apparatus 48, thereby yielding a concentrated, purified exosome powder 50. In addition or alternatively, the third retentate and/or permeate may be frozen or freeze dried to form an exosome concentrate. The system 10 can be configured to operate in continuous or batch mode. In embodiments, various components of the system 10 may be excluded, and additional components added.

In some examples, the exosome purification system 10 may begin with treatment of the milk product 12. The specific type of milk product 12 may vary. For example, the milk product 12 may include whole milk, buttermilk, or reduced fat milk derived from various species, e.g., bovine. Because milk products such as whole milk comprise a complex mixture of fats, proteins, and other macromolecules, isolation of exosomes directly from a milk product via membrane filtration may not be feasible. Insoluble and/or or various large molecules such as fats, lipids and minerals, for example, can clog the membranes. Even centrifuged, pre-filtered milk may have a fouling problem with membrane filtration techniques. Surprisingly, however, separating the milk product 12 into its constituent parts can provide a suitable source of exosomes, in the form of a whey composition 24, that is amenable to membrane filtration. The whey composition 24 can be obtained by first separating the milk product 12 into cream 14 and skim milk 16 in the separator 11. The skim milk 16 can be collected in a tub, tank, or other container, which is then used to transfer the skim milk to the acidification vat 18, which may coagulate the skim milk. In other embodiments, the skim milk 16 is funneled directly to the acidification vat or pre-treatment tank 18 from the separation apparatus 11.

In the acidification vat 18, the skim milk 16 can be treated with an acidifying agent 20, which can be injected into the acidification vat 18 via a valve-controlled input tube or pump, for example. The acidifying agent 20 may include one or more enzymes, bacterial cultures, and/or acids, e.g., lactic, citric, and/or phosphoric acid, configured to separate whey from the skim milk 16. In some examples, the acidifying agent 20 may be concentrated and may include sulfuric acid or various food grade acids. Bacterial cultures may include starter cultures configured to convert lactose into lactic acid, thereby lowering the pH of the skim milk 16. Regardless of the particular acidifying agent 20 employed, acidification of the skim milk 16 may lower its pH to about 4 to about 6, about 4 to about 5, or about 4.6. The temperature within the vat 18 may vary, ranging from about 40° F. to about 80° F., about 50° F. to about 75° F., about 60° F. to about 75° F., about 65° F. to about 72° F., or about 68° F. to about 72° F. The whey composition 24 separated from the aggregate material 22 can be collected in a tub, tank, or other container, or funneled directly to the next processing apparatus.

In some embodiments, the skim milk 16 may be subjected to enzymatic coagulation in lieu of acidification to isolate the whey composition 24. Such embodiments may include rennet coagulation of the skim milk 16. In additional examples, the skim milk 16 may be subjected to selective membrane filtration, e.g., microfiltration, to isolate the whey composition 24.

In some examples, the system 10 may be configured to receive the whey composition 24 directly, such that the whey composition, not the milk product 12, comprises the starting material. Accordingly, the system 10 may not be configured to separate a milk product 12 into cream 14 and skim milk 16, or to treat the separated skim milk 16 with an acidifying agent 20. In such embodiments, the whey composition 24 can be obtained as a dry powder or as a solution. A whey solution may be formed by reconstituting a whey powder with various liquids, e.g., water, saline, and/or various buffers.

In some embodiments, the whey composition 24 may be subjected to one or more pre-treatment steps before the exosome isolation process begins. Pre-treatment may be necessary to remove impurities and/or to increase the protein content of the whey composition 24. In some examples, the protein content of the whey composition 24 may range from about 30 wt % to about 85 wt %, about 40 wt % to about 75 wt %, about 45 wt % to about 65 wt %, about 50 wt % to about 60 wt %, or about 55 wt %. To increase the protein concentration of the whey composition 24, at least in part by removing lactose and various minerals therefrom, a first ultrafiltration step may be implemented using the first ultrafiltration apparatus 26, which may comprise a temperature-controlled tank coupled with one or more pumps. For example, the first ultrafiltration apparatus 26 may include an input pump configured to input the whey composition 24 into a temperature-controlled tank containing a first filtration membrane 27, which may be ceramic or polymeric. The first filtration apparatus 26 may also be coupled with two output pumps: one pump configured to remove the retentate 30 and pump it into a retention collection tank, and one pump configured to remove the permeate 28 and pump it into a permeate collection tank.

The whey composition 24 may be driven, via artificially pressurized mechanisms or gravity, across the first filtration membrane 27. The first filtration membrane 27 included in the first ultrafiltration apparatus 26 may vary in pore size and dimensions, depending at least in part on the desired protein content of the whey composition. In embodiments, the pore size of the first filtration membrane 27 may be configured to retain, in the retentate, components of the whey composition that have a molecular weight greater than about 5 kDa to about 50 kDa, about 5 kDa to about 40 kDa, about 5 kDa to about 30 kDa, about 5 kDa to about 20 kDa, about 5 kDa to about 15 kDa, about 8 kDa to about 12 kDa, or about 10 kDa. Depending on the desired throughput, the first filtration membrane 27 may define a rectangular perimeter ranging in size from about 2 in. by about 50 in., about 3 in. by about 40 in., about 4 in. by about 35 in., about 6 in. by about 30 in., about 8 in. by about 25 in., about 10 in. by about 22 in., about 12 in. by about 18 in., or about 14 in. by about 16 in. In specific embodiments, the first filtration membrane 27 may define a rectangular perimeter measuring about 4.3 in. by about 35.5 in. After ultrafiltration, the protein concentration of the first retentate 30, which may comprise exosomes and various additional proteins and cellular components, may range from about 34 wt % to about 90 wt %, about 45 wt % to about 85 wt %, about 50 wt % to about 80 wt %, about 55 wt % to about 80 wt %, about 60 wt % to about 80 wt %, about 70 wt % to about 80 wt %, about 75 wt % to about 85 wt %, or about 80 wt %. The average particle size of all double-membrane vesicles (DMVs), such as exosomes, present within the first retentate 30 may also vary, ranging from about 150 nm to about 230 nm, about 160 nm to about 210 nm, about 170 nm to about 190 nm, or about 180 nm in diameter.

In some embodiments, the first ultrafiltration step may be omitted if, for example, the protein concentration of the whey composition 24 is sufficient for producing a desired exosome yield. In additional examples, the first filtration membrane 27 may be loaded with charged molecules and/or antibodies to enhance filtration by separating additional components based on antibody affinity and/or molecular charge. Maintaining consistent filtration at the original pore size may require periodic cleaning or replacement of the filtration membrane. Depending on the throughput of the first ultrafiltration apparatus 26 and the applicable sanitation regulations, the membrane may be cleaned about every 24 to 48 hours.

After the optional first ultrafiltration step, the concentrated whey retentate 30 can be collected, for example in a retention tank or other container, and transferred either directly to the second ultrafiltration apparatus 34 or the microfiltration apparatus 31. The microfiltration apparatus 31 may comprise a temperature-controlled tank coupled with one or more pumps. The microfiltration conditions, e.g., time, temperature, pressure, etc., may vary within the microfiltration apparatus 31. For example, the temperature may be elevated during microfiltration, or the temperature may be held at or even below approximately ambient, e.g., room, temperature. In some embodiments, the temperature may be elevated to about 45° F. to about 180° F., about 55° F. to about 160° F., about 65° F. to about 140° F., about 75° F. to about 125° F., about 85° F. to about 115° F., about 95° F. to about 105° F., or about 100° F. The pressure within the microfiltration apparatus 31 may also vary, ranging from about 5 psi to about 50 psi, about 10 psi to about 40 psi, about 15 psi to about 30 psi, about 18 psi to about 22 psi, or about 20 psi. The flow rate through the microfiltration apparatus 31, and thus the filtration membrane 32 therein, may also vary, ranging from about 0.1 gallons per minute (gpm) to about 10 gpm, about 0.5 gpm to about 8 gpm, about 1 gpm to about 6 gpm, about 1.5 gpm to about 4 gpm, about 1.5 gpm to about 2.5 gpm, about 2 gpm to about 3 gpm, or about 2 gpm.

The microfiltration membrane 32 included in the microfiltration apparatus 31 may vary in dimensions and/or pore size. In embodiments, the pore size of the microfiltration membrane 32 may be configured to retain, in a retentate, components of the first retentate 30 or whey composition 24 having a molecular weight ranging from about 500 kDa to about 1000 kDa, about 700 kDa to about 900 kDa, about 750 kDa to about 850 kDa, about 775 kDa to about 825 kDa, or about 800 kDa, thereby allowing smaller particles to pass through in the permeate 33. The average particle size of all DMVs present within the microfiltration permeate 33 may vary, ranging from about 70 nm to about 150 nm, about 80 nm to about 140 nm, about 90 nm to about 130 nm, about 100 nm to about 120 nm, or about 105 nm to about 115 nm in diameter. Depending on the desired throughput, the microfiltration membrane 32 may define a rectangular perimeter ranging in size from about 2 in. by about 50 in., about 3 in. by about 40 in., about 4 in. by about 35 in., about 6 in. by about 30 in., about 8 in. by about 25 in., about 10 in. by about 22 in., about 12 in. by about 18 in., or about 14 in. by about 16 in. In specific embodiments, the microfiltration membrane 32 may define a rectangular perimeter measuring about 4.3 in. by about 35.5 in.

The microfiltration permeate 33 may be collected, e.g., in a tank or container, and passed to the second ultrafiltration apparatus 34. As mentioned above, certain embodiments may instead involve collection and transport of the first retentate 30 directly to the second ultrafiltration apparatus 34. Like the first ultrafiltration apparatus 26 and microfiltration apparatus 31, the second ultrafiltration apparatus 34 may comprise a temperature-controlled tank coupled with one or more pumps. The ultrafiltration conditions, e.g., time, temperature, pressure, etc., may also vary. For example, the temperature may be elevated during ultrafiltration, or the temperature may be held at or even below approximately ambient, e.g., room, temperature. In some embodiments, the temperature may be elevated to about 45° F. to about 180° F., about 55° F. to about 170° F., about 65° F. to about 160° F., about 80° F. to about 140° F., about 90° F. to about 130° F., about 105° F. to about 130° F., about 109° F. to about 130° F., about 100° F. to about 120° F., about 105° F. to about 115° F., or about 110° F. In additional embodiments, the temperature may range from about 60° F. to about 80° F., about 65° F. to about 75° F., or about 68° F. to about 74° F. In additional embodiments, the temperature may range from about 40° F. to about 60° F., about 45° F. to about 55° F., or about 48° F. to about 52° F. The pressure within the second ultrafiltration apparatus 34 may also vary, ranging from about 20 psi to about 100 psi, about 30 psi to about 90 psi, about 40 psi to about 80 psi, about 50 psi to about 70 psi, about 55 psi to about 65 psi, or about 60 psi. The flow rate through the second filtration apparatus 34, and thus the filtration membrane therein, may also vary, ranging from about 0.1 gpm to about 10 gpm, about 0.5 gpm to about 8 gpm, about 1 gpm to about 6 gpm, about 1.5 gpm to about 4 gpm, about 1.5 gpm to about 2.5 gpm, about 2 gpm to about 3 gpm, or about 2 gpm. In various embodiments, the second filtration membrane 35 may not be loaded with charged particles or antibodies.

The second filtration membrane 35 included in the second ultrafiltration apparatus 34 may also vary in dimensions and/or pore size. In embodiments, the pore size of the second filtration membrane 35 may be configured to retain, in the second retentate 38, components of the whey composition or microfiltration permeate 33 having a molecular weight greater than about 10 kDa to about 90 kDa, about 20 kDa to about 80 kDa, about 30 kDa to about 70 kDa, about 40 kDa to about 60 kDa, about 45 kDa to about 55 kDa, about 48 kDa to about 52 kDa, or about 50 kDa. Depending on the desired throughput, the second filtration membrane 35 may define a rectangular perimeter ranging in size from about 2 in. by about 50 in., about 3 in. by about 40 in., about 4 in. by about 35 in., about 6 in. by about 30 in., about 8 in. by about 25 in., about 10 in. by about 22 in., about 12 in. by about 18 in., or about 14 in. by about 16 in. In specific embodiments, the second filtration membrane 35 may define a rectangular perimeter measuring about 4.3 in. by about 35.5 in.

Before and/or during its passage through the second filtration apparatus 34, the concentrated retentate 30 or microfiltration permeate 33 may be subjected to $CO_2$ treatment to dissociate large protein complexes, e.g., phospholipids such as casein, into smaller components and micelles that can pass through the second filtration membrane 35. Carbon dioxide treatment may involve injection of $CO_2$ directly into the second filtration apparatus 34, including the filtration membrane contained therein. Treatment with $CO_2$ may reduce the pH of the material passing through the apparatus 34 without producing additional acids therein. In some examples, the pH of the retentate 30 or permeate 33 after $CO_2$ treatment may be reduced to about 4 to about 6.5, about 5 to about 6, about 5.5 to about 6, or about 5.7. In some implementations, the $CO_2$ injector 36 may comprise a $CO_2$ chamber coupled with the second filtration apparatus 34 via one or more valve-controlled tubes.

As stated above, passage through the first ultrafiltration apparatus 26 and/or microfiltration apparatus 31 may be optional. Accordingly, various implementations may involve the passage of the whey composition 24, the first retentate 30, or the microfiltration permeate 33 through the second ultrafiltration apparatus 34. Ultrafiltration of the first retentate 30, original whey composition 24, or microfiltration permeate 33 yields a second permeate 37 and a second retentate 38. The second permeate 37 can include various small molecular weight proteins, e.g., less than about 50 kDa, such as lactose, various minerals, various proteins, residual casein, β-lactoglobulin, α-lactoglobulin, NPN, enzymes, lactose, ash, and/or salt. The second retentate 38 can include BSA, Immunoglobulin, Lactoferrin, fat globules, exosomes, yeast, bacteria, and/or other somatic cells. In some examples, the components of the second retentate 38 may have a minimum molecular weight of about 50 kDa. The second retentate 38 can be collected, for example in a retention tank, and/or transferred directly via one or more pumps and tubes to the third, and possibly final, ultrafiltration apparatus 40. In some examples, the concentration of whey present in the second retentate 38 may be about 12 to about 15 times greater than the concentration of whey present in the original whey composition 24. The average particle size of all DMVs present within the second retentate 38 may also vary, ranging from about 200 nm to about 400 nm, about 250 nm to about 350 nm, about 275 nm to about 325 nm, or about 295 nm to about 305 nm in diameter.

The second permeate 37 may contain a substantial concentration of DMVs, including exosomes. In some examples, the second permeate 37 may even contain the highest concentration of exosomes with the least amount of extraneous proteins relative to the other retentates and permeates collected within the system 10. The exosome concentration of the second permeate may range from about $7.12 \times 10^8$ exosomes/mL to about $2.34 \times 10^{10}$ exosomes/mL.

The average particle size of the exosomes within the second permeate 37 may range from about 20 nm to about 200 nm, about 40 nm to about 180 nm, about 60 nm to about 150 nm, about 70 nm to about 130 nm, about 80 nm to about 110 nm, or about 95 nm. Due to its high exosome concentration, the second permeate 37 can be transferred directly to the spray dryer 48 in some embodiments, where it can be dried into a high-yield exosome powder. In addition or alternatively, the second permeate 37 may be treated to form a frozen concentrate or a freeze-dried powder.

The third filtration apparatus 40 may comprise a temperature-controlled tank coupled with one or more pumps. One pump may direct the second retentate 38 into the apparatus, a second pump may remove the third retentate 44, and another pump may remove the third permeate 46. The ultrafiltration conditions, e.g., time, temperature, pressure, etc., may also vary. For example, the temperature may be elevated during ultrafiltration, or the temperature may be held at or even below approximately ambient, e.g., room, temperature. In some embodiments, the temperature may be elevated to about 80° F. to about 140° F., about 90° F. to about 130° F., about 100° F. to about 120° F., about 105° F. to about 115° F., or about 110° F. In additional embodiments, the temperature may range from about 60° F. to about 80° F., about 65° F. to about 75° F., or about 68° F. to about 74° F. In additional embodiments, the temperature may range from about 40° F. to about 60° F., about 45° F. to about 55° F., or about 48° F. to about 52° F. The pressure within the third ultrafiltration apparatus 40 may also vary, ranging from about 20 psi to about 100 psi, about 30 psi to about 90 psi, about 40 psi to about 80 psi, about 50 psi to about 70 psi, about 55 psi to about 65 psi, or about 60 psi. The flow rate through the third filtration apparatus 40, and thus the filtration membrane therein, may also vary, ranging from about 0.1 gallons per minute (gpm) to about 10 gpm, about 0.5 gpm to about 8 gpm, about 1 gpm to about 6 gpm, about 1.5 gpm to about 4 gpm, about 1.5 gpm to about 2.5 gpm, about 2 gpm to about 3 gpm, or about 2 gpm. In various embodiments, the third filtration membrane 41 may not be loaded with charged particles or antibodies.

The third filtration membrane 41 employed may be configured to selectively allow exosomes to pass through with the permeate 46, although exosomes may be present in the retentate 44 as well. Because the molecular weight of some exosomes may range from about 50 kDa to about 100 kDa, the final filtration membrane (which may be the third filtration membrane 41 depending on how many ultrafiltration steps are implemented) may have a pore size configured to retain, in the third retentate 44, components of the second retentate 38 that have a molecular weight of least about 100 kDa, thus only allowing components 100 kDa or smaller to pass through with the third permeate 46. The molecular weight of exosomes may vary, ranging from about 30 kDa up to about 150 kDa. Accordingly, the third permeate 46 can generally include smaller exosomes, e.g., particles ranging up to 100 kDa, while the third retentate 44 can generally include larger exosomes. To capture variously sized exosomes in either the third retentate 44 or third permeate 46, the pore size of the third filtration membrane 41 may be configured to retain components of the second retentate 38 that have a molecular weight ranging from about 50 kDa to about 150 kDa, about 60 kDa to about 140 kDa, about 70 kDa to about 130 kDa, about 80 kDa to about 120 kDa, about 90 kDa to about 110 kDa, about 95 kDa to about 105 kDa, or about 100 kDa. The size of the isolated exosomes contained in the third permeate 46 may vary. For example, the average diameter of the exosomes in the third permeate 46 may range from about 30 nm to about 200 nm, about 50 nm to about 190 nm, about 65 nm to about 175 nm, about 75 nm to about 150 nm, about 85 nm to about 125 nm, about 90 nm to about 100 nm, or about 95 nm. The average particle size of the exosomes present in the third permeate 46 may thus be similar to the average particle size of the exosomes present in the second permeate 37. One or more properties of the exosomes, however, may differ between the two samples. For instance, the hydrophobicity, charge and/or structure may vary. In some embodiments, certain exosomes may be captured in the second retentate 38 due to interactions or binding with larger proteins. Such exosomes may become unbound or dissociated with the larger proteins and released within the third permeate 46. In addition or alternatively, exosomes may become unbound or dissociated with larger proteins and released within the third retentate 44 after filtration and thus may have smaller particles compared to the third permeate 46. The average diameter of the exosomes in the third retentate 44 may range from about 50 nm to about 100 nm, about 60 nm to about 90 nm, about 70 nm to about 80 nm, or about 75 nm. Depending on the desired throughput, the third filtration membrane 41 may define a rectangular perimeter ranging in size from about 2 in. by about 50 in., about 3 in. by about 40 in., about 4 in. by about 35 in., about 6 in. by about 30 in., about 8 in. by about 25 in., about 10 in. by about 22 in., about 12 in. by about 18 in., or about 14 in. by about 16 in. In specific embodiments, the third filtration membrane 41 may define a rectangular perimeter measuring about 4.3 in. by about 35.5 in.

Before and/or during its passage through the third filtration apparatus 40, the second retentate 38 may be subjected to $CO_2$ treatment to dissociate large protein complexes, e.g., phosphoprotein such as casein, into smaller components and micelles that can pass through the third filtration membrane 41. A chelator such as EDTA, trisodium citrate can also be used, which may also change the ionic strength, thereby facilitating the separation, removal and/or purification of desired components. Carbon dioxide treatment may involve injection of $CO_2$ directly into the third filtration apparatus 40 from a second $CO_2$ injector 42. Treatment with $CO_2$ may reduce the pH of the retentate 38 passing through the apparatus 40 without producing additional acids therein. In some examples, the pH of the retentate 38 may be reduced to about 4 to about 6.5, about 5 to about 6, about 5.5 to about 6, or about 5.7 after $CO_2$ treatment. In some implementations, the $CO_2$ injector 42 may comprise a $CO_2$ chamber coupled with the third filtration apparatus 40 via one or more valve-controlled tubes.

The third retentate 44 may include various fat molecules and/or antibodies, which may collectively have a minimum molecular weight of about 100 kDa in some examples. The third permeate 46 may include a concentrated exosome solution, which may include exosomes ranging in molecular weight from about 50 kDa to about 100 kDa. In some examples, the concentration of whey present in the third permeate 46 may be about 18 to about 20 times greater than the concentration whey present in the original whey composition 24. The exosome concentration may be quantified by pooling the third permeate 46 and/or the third retentate 44 and analyzing at least one sample using a nanoparticle quantification apparatus, e.g., a NanoSight machine manufactured by Malvern Instruments Ltd.

After collection of the third permeate 46 and/or retentate 44, e.g., in a tank, tub, or other container, the sample(s) may be transferred to a spray dryer 48, which dries the sample(s) into an exosome powder 50. In some examples, the third permeate 46 and/or retentate 44 may be transferred directly to the spray dryer 48 via a tube or pump. The final exosome yield may vary depending on the starting protein concentration of the whey solution 24, as the exosomes may be separated during phase separation of the protein contained within the whey solution. In some examples, the exosomes may be reconstituted in one or more liquids, e.g., neutral buffers. The exosomes may be stored at −80° C. for long term storage, or at refrigeration temperatures, e.g., about 4° C., for short term storage.

Depending on the starting material and batch size, the purification process may be performed in about 8 to about 10 hours. The total processing time may be greater when milk product separation is performed. Pre-treatment of the whey solution 24 may also extend the processing time, for example. The purification techniques implemented by the system 10 may be scaled up for commercial production. Increasing production may involve increasing a flow rate and/or increasing the quantity of starting materials. Additional ultrafiltration apparatuses may also be implemented and configured to operate in parallel, for example. In some embodiments, processed whey streams having high fat content can be subjected to centrifugation, e.g., microcentrifugation, to remove excess fat prior to one or more of the ultrafiltration steps described herein.

In some examples, an additional ultrafiltration step may be employed to further concentrate the third permeate 46 and/or the third retentate 44. The pore size and dimensions of the filtration membrane implemented for an additional ultrafiltration step may vary. In some embodiments, the additional filtration membrane may be configured to retain components of the third permeate 46 that have a molecular weight greater than about 100 kDa. In some examples, the additional filtration membrane may be configured to retain molecules ranging in molecular weight from about 5 kDa to about 50 kDa, about 5 kDa to about 15 kDa, about 10 kDa to about 40 kDa, or about 20 kDa to about 30 kDa. In addition or alternatively, size exclusion chromatography may be implemented to further concentrate the final exosome solution. In some examples, at least one diafiltration step may be implemented to wash the third permeate 46 and/or retentate 44, thereby removing additional impurities, e.g., salts or solvents.

Embodiments may also involve one or more fractionation steps configured to separate DMVs present within a given permeate or retentate based on size. By fractionating, exosomes of a particular size can be isolated, which may be critical for downstream applications of such exosomes. For instance, specifically sized exosomes may be required for their inclusion in certain food or pharmaceutical products. Exosomes may also be loaded with cellular nutrients and anti-oxidants providing the ability to produce exosomes with different sizes and different functionalities for use in a variety of different applications. Fractionation may also be used to determine the type(s) of exosomes that can be purified from specific starting materials.

Figure 2:
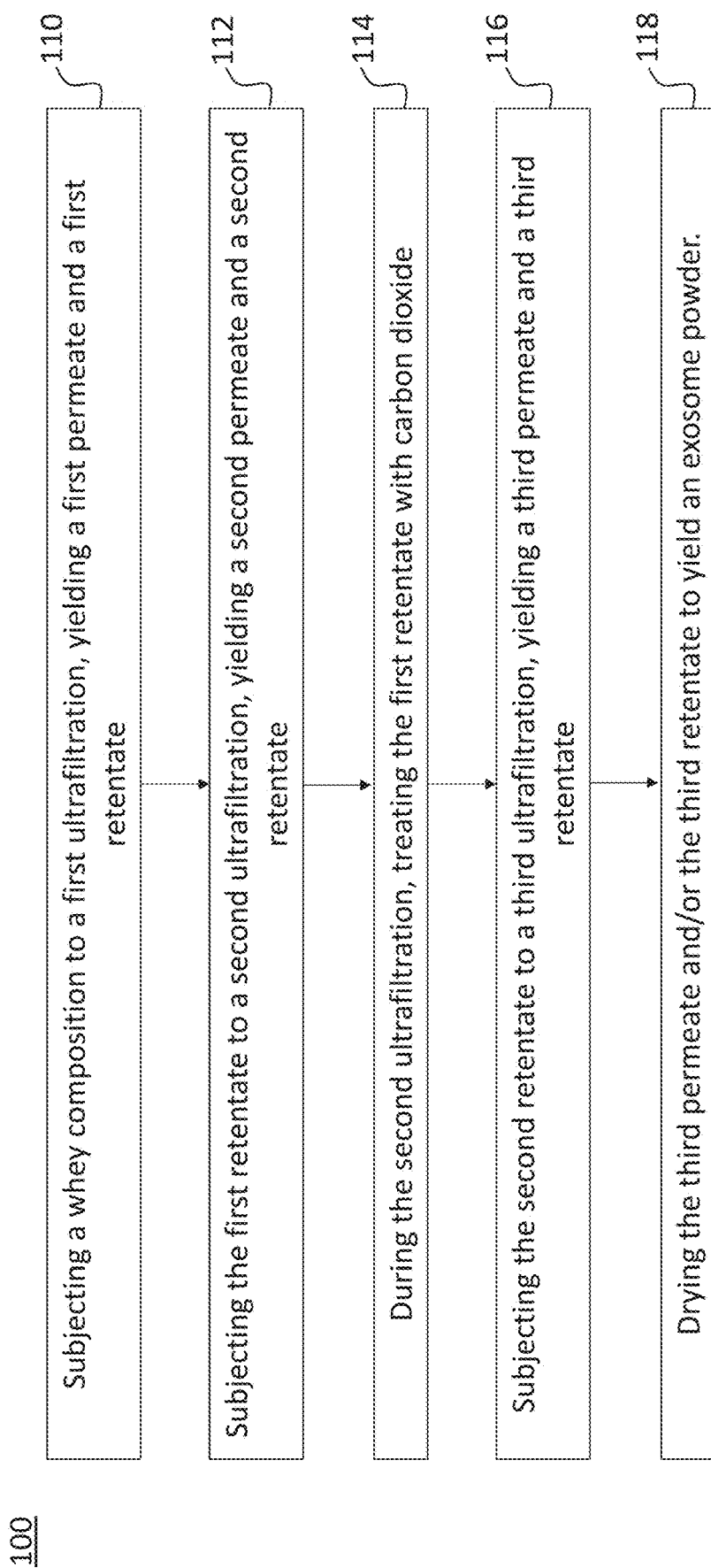
FIG. 2 is a flow diagram of an exosome purification method performed in accordance with principles of the present disclosure.

FIG. 2 is a flow diagram of a method of exosome purification performed in accordance with principles of the present disclosure. The example method 100 shows the steps that may be implemented, in any sequence, to purify exosomes from a starting whey composition. In additional examples, one or more of the steps shown in the method 100 may be omitted. Additional steps can also be added in specific implementations.

At block 110, the method involves "subjecting a whey composition to a first ultrafiltration, yielding a first permeate and a first retentate." In some examples, the whey composition may be subjected to a first microfiltration in lieu of or in combination with the first ultrafiltration. Examples may also involve additional pre-processing steps employed to first obtain the whey composition used as a starting material. Such pre-processing steps may entail treating a milk composition by separating the skim milk fraction therefrom and subjecting it acidification, coagulation, selective filtration, or combinations thereof.

At block 112, the method involves "subjecting the first retentate to a second ultrafiltration, yielding a second permeate and a second retentate." In some examples, the second ultrafiltration can be performed at a temperature ranging from about 45 to about 180° F. or about 109 to about 130° F. The pressure within the second ultrafiltration apparatus may be about 60 psi, and the flow rate of the first retentate through the apparatus may be about 2 gallons per minute. In some examples, the first retentate may initially be passed through a microfiltration apparatus, which can be configured to retain large molecular weight molecules, e.g., greater than 800 kDa. According to such examples, the microfiltration permeate can then be subjected to the second ultrafiltration.

At block 114, the method involves "during the second ultrafiltration, treating the first retentate with carbon dioxide." Carbon dioxide treatment may be implemented using a variety of mechanisms. In some embodiments, a carbon dioxide injector can be coupled with the second ultrafiltration apparatus. In this arrangement, the injector can inject carbon dioxide at a constant, pre-specified rate directly into the stream of the first retentate as the retentate passes through the second ultrafiltration apparatus.

At block 116, the method involves "subjecting the second retentate to a third ultrafiltration, yielding a third permeate and a third retentate." In various examples, the third ultrafiltration can be performed at a temperature of about 100° F. to about 120° F. and a pressure of about 60 psi. The flow rate of the second retentate passing through the third ultrafiltration apparatus may be about 2 gallons per minute. Carbon dioxide treatment may also be performed during the third ultrafiltration, using the same or similar approaches as the carbon dioxide treatment implemented during the second ultrafiltration.

At block 118, the method involves "drying the third permeate and/or the third retentate to yield an exosome powder." In some examples, the third permeate and/or retentate may not be dried, and may instead remain as a concentrated liquid, for instance.

EXAMPLES

Figure 9:
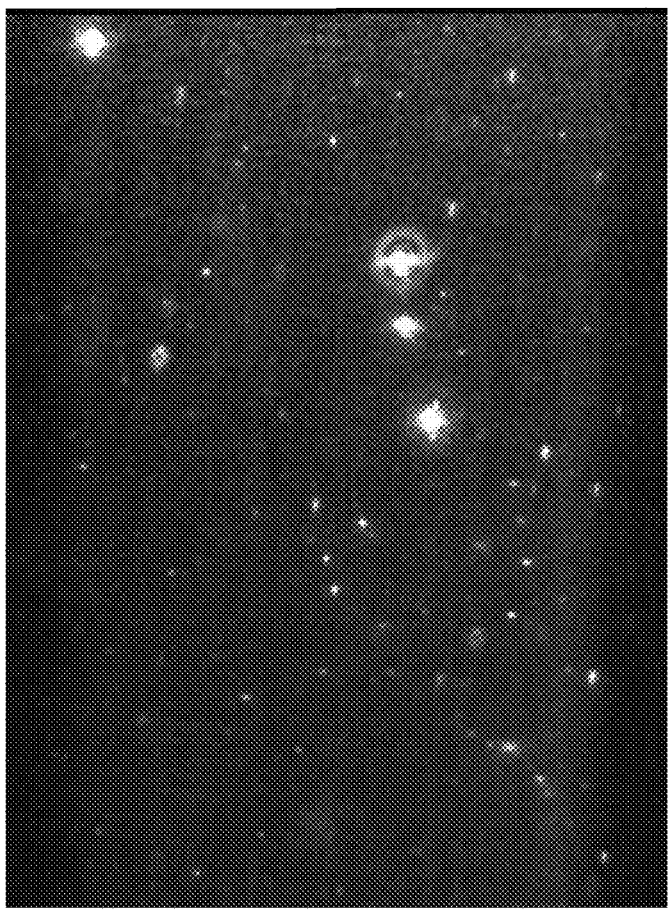
FIG. 9 is a screen shot of a video taken during nanoparticle tracking analysis (NTA) showing exosomes illuminated.

Fluorescent nanoparticle tracking analysis (NTA) was used to analyze the concentration and average particle size of DMVs, e.g., exosomes, included in retentates or permeates at various stages of an exosome purification process. NTA involved treating a test sample with a fluorescent dye that preferentially stained the DMVs and then directing a laser toward the sample. The sample scattered light from the laser, an effect which was captured by a camera operating at 30 frames per second. Based on the light scattering, NTA software captured data on the particles within the sample and calculated the concentration and the hydrodynamic diameter of each particle using the Stokes-Einstein equation ($D=kT/6\pi R\eta$). FIG. 9 is a screen shot of a video taken during NTA showing exosomes illuminated.

Figure 3:
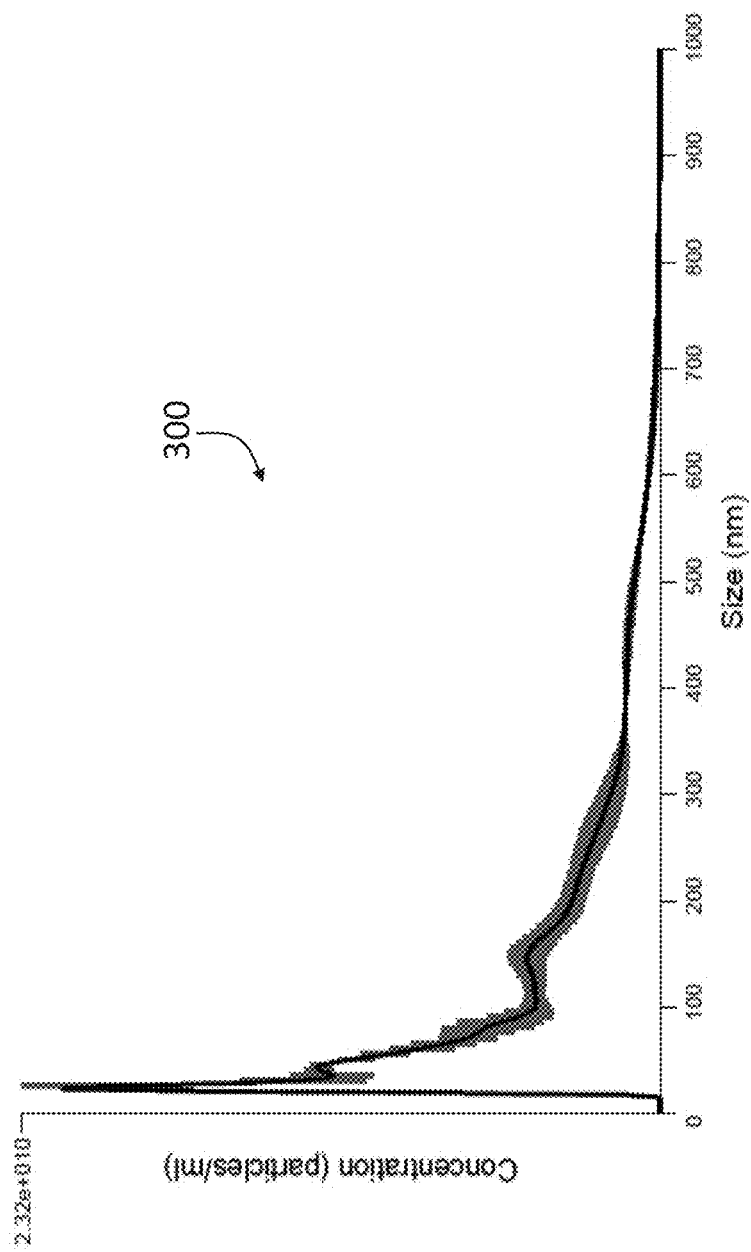
FIG. 3 is a chromatograph showing the concentration and size of double-membrane vesicles included in the permeate of a sample passed through a 10 kDa filtration membrane in accordance with principles of the present disclosure.

The starting material consisted of a 55 wt % whey protein concentrate (WPC 55), which is a byproduct of cheese production. The WPC 55 was processed through a 10 kDa filtration membrane (such as membrane 27) to remove lactose and minerals and to concentrate the protein to 80 wt % (WPC 80). FIG. 3 includes a chromatograph 300 showing the results of the fluorescent NTA for WPC 80. The average DMV size was about 179 nm, and as shown, the majority of the particles were between about 25 nm and 300 nm in diameter, although a wide range of differently sized particles were present in the sample.

Figure 4:
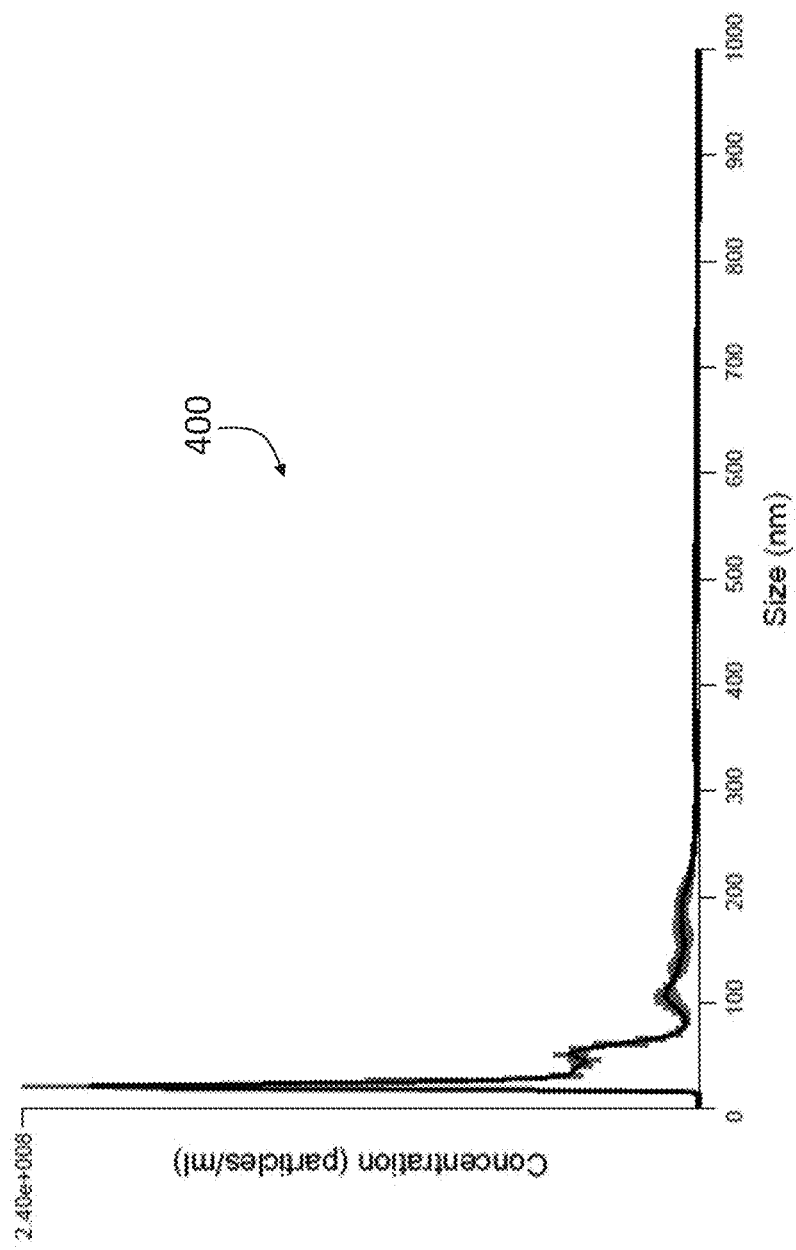
FIG. 4 is a chromatograph showing the concentration and size of double-membrane vesicles included in the permeate of a sample passed through an 800 kDa filtration membrane in accordance with principles of the present disclosure.

The WPC 80 was then microfiltered though an 800 kDa filtration membrane (such as membrane 32). The resulting permeate, examined via fluorescent NTA, exhibited a reduction in total DMV count, as apparent in the chromatograph 400 of FIG. 4. This reduction may be due to the removal of DMVs larger than 150 nm. Overall, the average particle size of DMVs was about 112 nm in diameter. A noticeable decrease in the number of larger particles, relative to the sample represented in chromatograph 300, was also observed.

Figure 5:
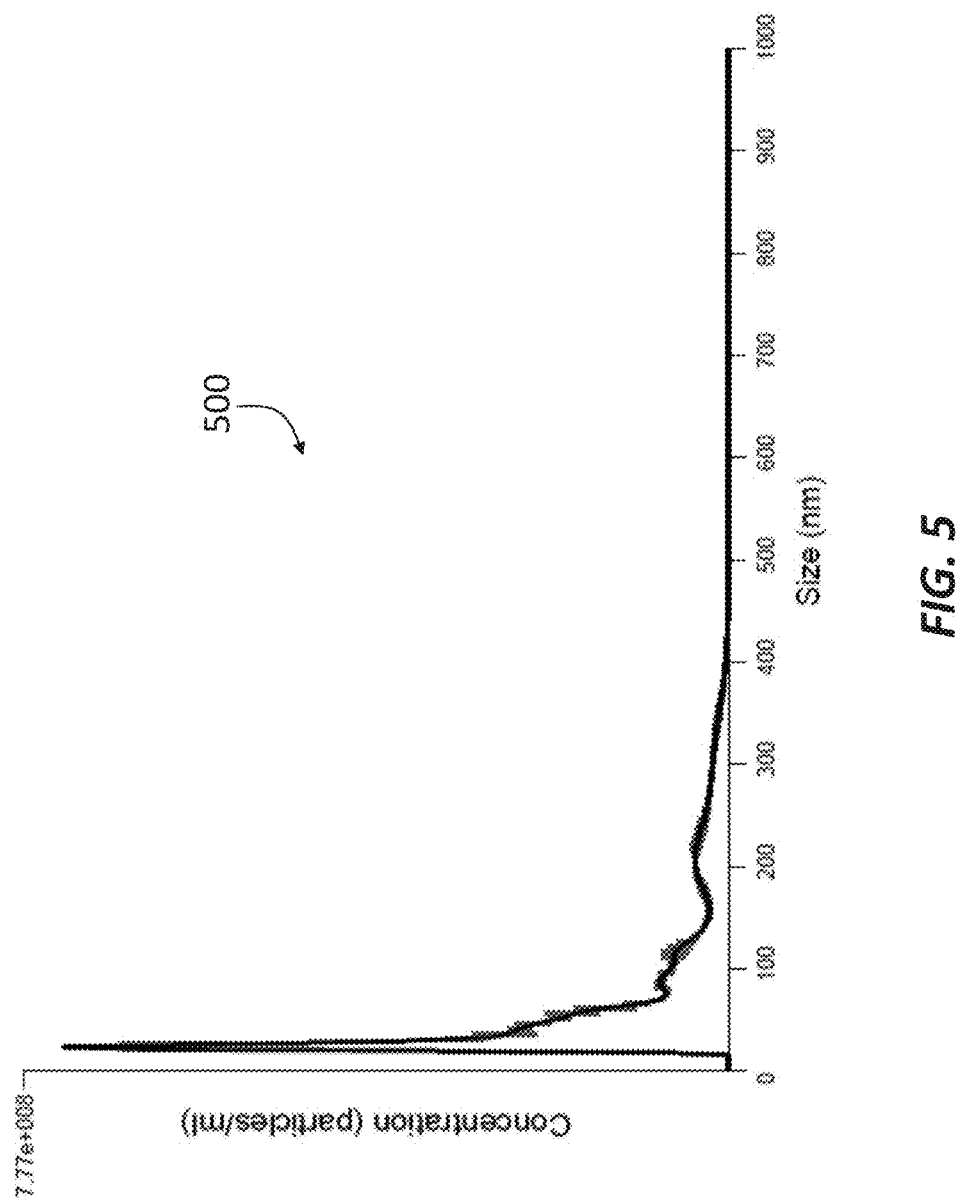
FIG. 5 is a chromatograph showing the concentration and size of double-membrane vesicles included in the permeate of a sample passed through a 50 kDa filtration membrane in accordance with principles of the present disclosure.
Figure 6:
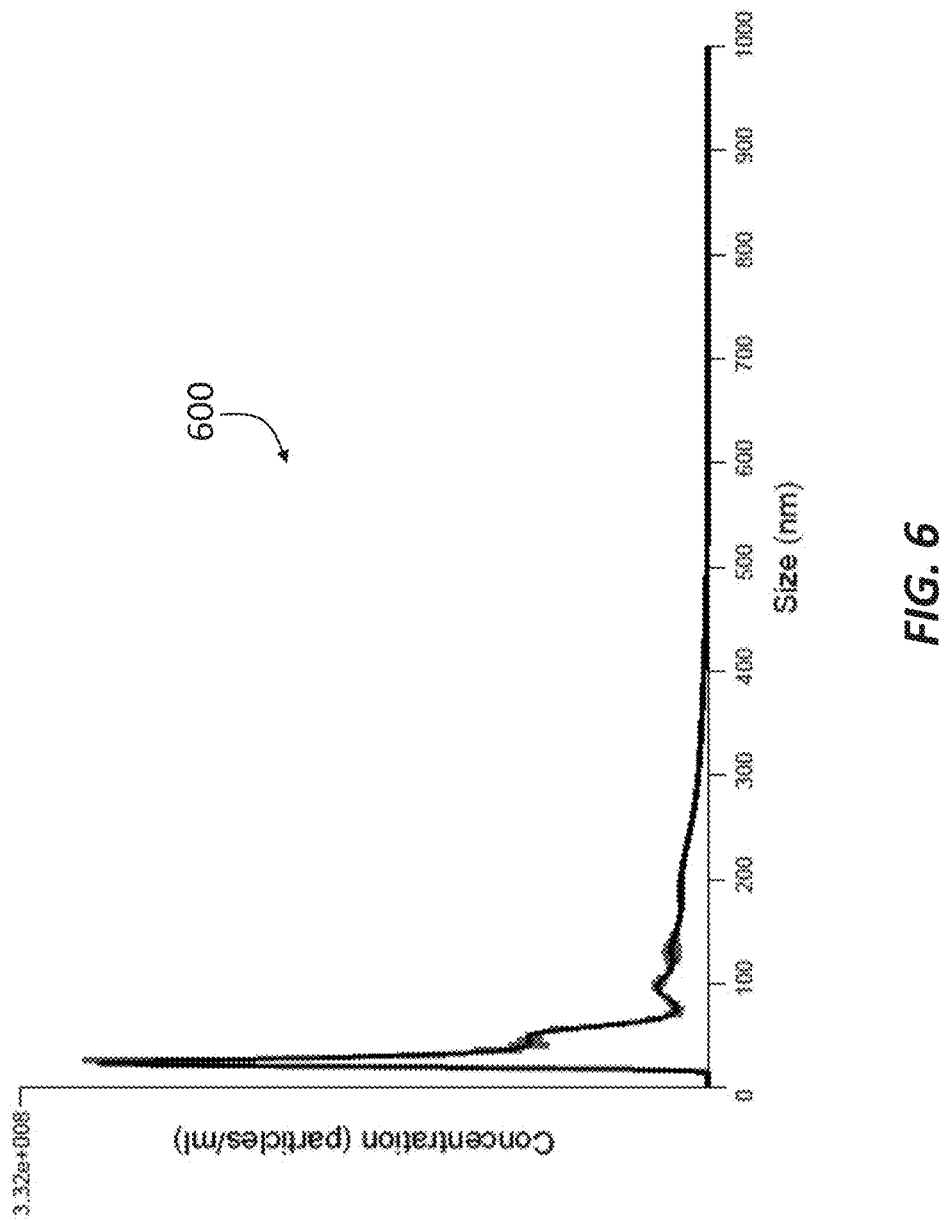
FIG. 6 is a chromatograph showing the concentration and size of double-membrane vesicles included in the permeate of a sample passed through a 100 kDa filtration membrane in accordance with principles of the present disclosure.
Figure 7:
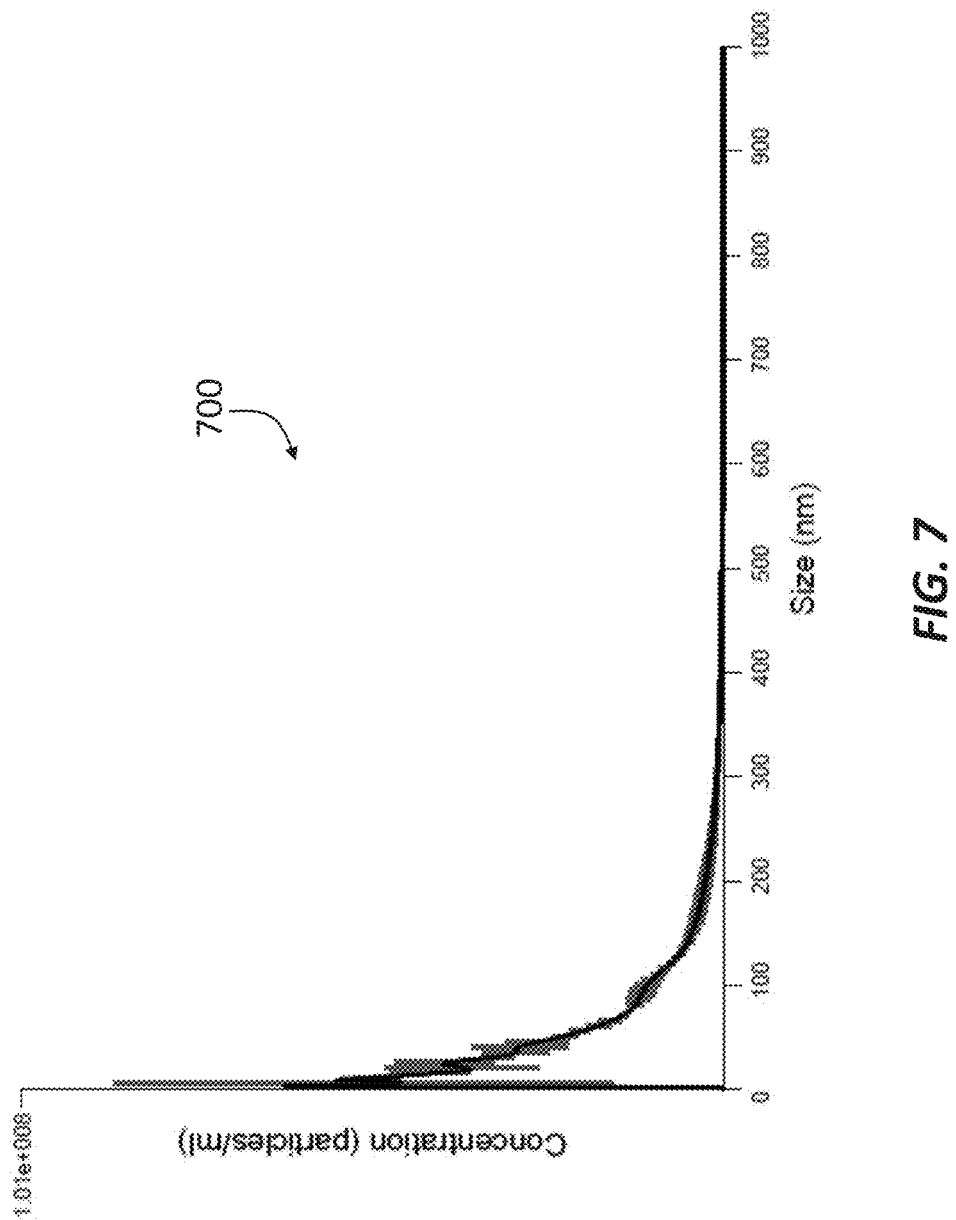
FIG. 7 is a chromatograph showing the concentration and size of double-membrane vesicles included in the retentate of a sample passed through a 100 kDa filtration membrane in accordance with principles of the present disclosure.

The permeate was then passed through a 50 kDa filtration membrane (such as membrane 35), which produced a permeate having an average size of about 95 nm, as shown in the chromatograph 500 of FIG. 5. The fraction that did not pass through the 50 kDa filtration membrane, i.e., the retentate, was then passed through a 100 kDa filtration membrane (such as membrane 41), and the resulting permeate represented in the chromatograph 600 of FIG. 6. Similar to the permeate represented in FIG. 5, the DMVs in the permeate represented in the chromatograph 600 of FIG. 6 had an average size of about 94 nm, indicating that the permeate allowed to pass through the 50 kDa filtration membrane and the permeate allowed through the 100 kDa may comprise similar exosome content. The retentate collected at the 100 kDa filtration membrane was determined to include DMVs having an average size of about 74 nm, as shown in the chromatograph 700 of FIG. 7.

Although the average DMV size from the 50 kDa permeate and the 100 kDa permeate were similar, it is possible that these fractions represented distinct populations of DMVs, each population characterized by different biochemical properties. Increasing the pore size from the 50 kDa filtration membrane to the 100 kDa filtration membrane may have allowed passage of the DMVs that are larger in size and configuration due to complexing with proteins/peptides. This is demonstrated, for example, in FIGS. 6 and 7, which clearly show distinct DMV populations.

Figure 8:
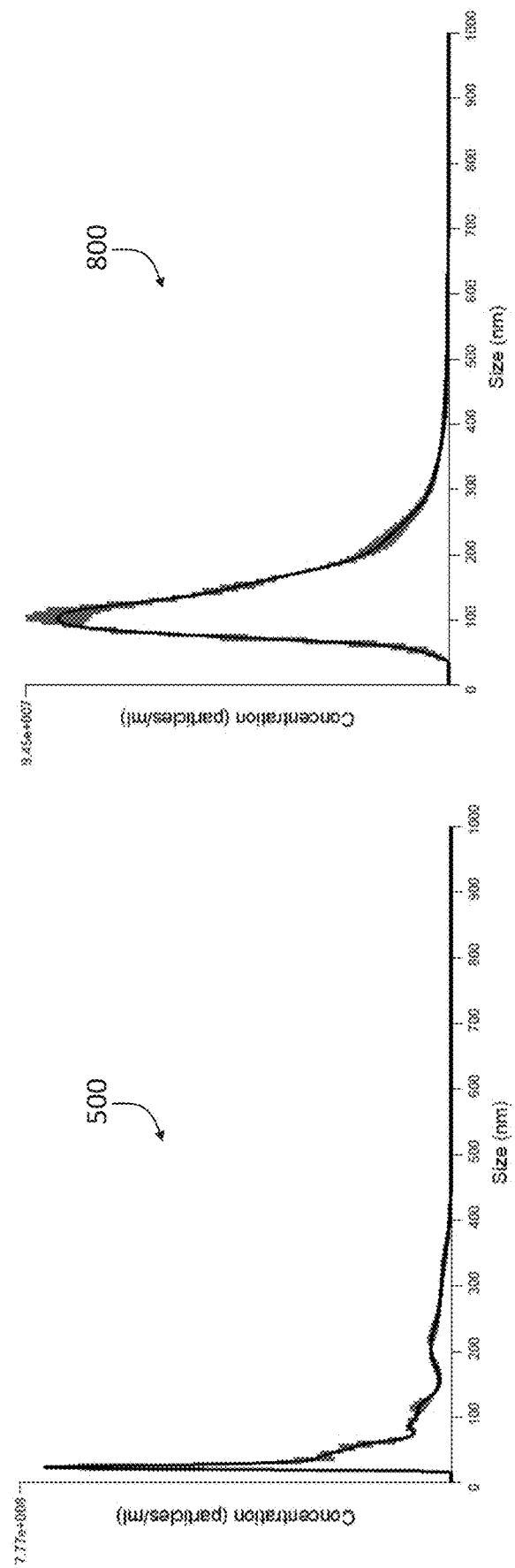
FIG. 8 is a side-by-side comparison of two chromatographs showing the concentration and size of double-membrane vesicles included in the permeates of two samples passed separately through a 50 kDa filtration membrane in accordance with principles of the present disclosure.

The aforementioned exosome purification process was repeated and a sample of the 50 kDa permeate from the second run was analyzed via fluorescent NTA. A comparison the 50 kDa permeates obtained in the first run and the second run is shown in FIG. 8. The chromatograph 500 on the left representing the first sample and the chromatograph on the right 800 representing the second sample. There was a similar number of total nanoparticles obtained in the first and second runs ($2.3 \times 10^{10}$ and $9.2 \times 10^9$ DMVs/mL, respectively); however, there was a shift in average particle size, as the average particle size from the second run (greater than 100 nm) was noticeably larger than average particle size from the first run (about 95 nm). This variation in size could be attributed to variation in the starting material. For example, WPC 55 may encompass whey protein concentrates ranging from 55-57 wt %. Alternatively, the observed size variation may relate to the different milking seasons when the exosome purifications were performed. Seasonal variation can be common in milk and milk products.

As used herein, the term "about" modifying, for example, the quantity of a component in a composition, concentration, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents to these quantities.

Similarly, it should be appreciated that in the foregoing description of example embodiments, various features are sometimes grouped together in a single embodiment for the purpose of streamlining the disclosure and aiding in the understanding of one or more of the various aspects. These methods of disclosure, however, are not to be interpreted as reflecting an intention that the claims require more features than are expressly recited in each claim. Rather, as the following claims reflect, inventive aspects lie in less than all features of a single foregoing disclosed embodiment, and each embodiment described herein may contain more than one inventive feature.

Although the present disclosure provides references to preferred embodiments, persons skilled in the art will recognize that changes may be made in form and detail without departing from the spirit and scope of the invention.

What is claimed is:

1. A method of purifying exosomes, the method comprising:
    subjecting a whey composition to a first ultrafiltration, wherein the first ultrafiltration yields a first permeate and a first retentate;
    subjecting the first retentate to a second ultrafiltration, wherein the second ultrafiltration yields a second permeate and a second retentate;
    during the second ultrafiltration, treating the first retentate with carbon dioxide;
    subjecting the second retentate to a third ultrafiltration, wherein the third ultrafiltration yields a third permeate and a third retentate;
    drying the third permeate to yield an exosome powder.

2. The method of claim 1, further comprising during the third ultrafiltration, treating the second retentate with carbon dioxide.

3. The method of claim 1, further comprising prior to subjecting a whey composition to a first ultrafiltration, isolating the whey composition from a milk product.

4. The method of claim 3, wherein isolating the whey composition from a milk product comprises:
    separating the milk product into cream and skim milk;
    acidifying the skim milk; and
    separating the whey composition from the acidified skim milk.

5. The method of claim 3, wherein the milk product comprises whole milk or reduced fat milk.

6. The method of claim 1, wherein the first retentate comprises about 34 wt % to about 90 wt % protein.

7. The method of claim 1, wherein the first ultrafiltration is performed using a first filtration membrane configured to retain molecules having a molecular weight greater than about 10 kDa.

8. The method of claim 1, wherein the second ultrafiltration is performed at a temperature of about 45° F. to about 180° F., a pressure of about 60 psi, and a flow rate of about 2 gallons per minute.

9. The method of claim 1, wherein the third ultrafiltration is performed at a temperature of about 110° F., a pressure of about 60 psi, and a flow rate of about 2 gallons per minute.

10. The method of claim 1, wherein the second ultrafiltration is performed using a second filtration membrane configured to retain molecules having a molecular weight greater than about 50 kDa.

11. The method of claim 1, wherein the third ultrafiltration is performed using a third filtration membrane configured to retain molecules having a molecular weight greater than about 100 kDa.

12. The method of claim 1, wherein the third permeate comprises molecules having a molecular weight of about 50 kDa to about 100 kDa.

13. The method of claim 1, wherein the second retentate comprises fat, high molecular weight proteins, and exosomes.

14. The method of claim 1, wherein the third permeate comprises a concentrated exosome solution, and wherein drying comprises spray drying.

15. The method of claim 1, wherein treating the first retentate with carbon dioxide comprises injecting the carbon dioxide into a tank containing the first retentate.

16. The method of claim 15, wherein the first retentate drops to a pH of about 5.7 as a result of treating the first retentate with carbon dioxide.

17. A system for purifying exosomes, the system comprising:

a first ultrafiltration apparatus configured to subject a whey composition to a first ultrafiltration, wherein the first ultrafiltration yields a first permeate and a first retentate;

a second ultrafiltration apparatus configured to subject the first retentate to a second ultrafiltration, wherein the second ultrafiltration yields a second permeate and a second retentate;

a carbon dioxide injector coupled with the second ultrafiltration apparatus, the carbon dioxide injector configured to inject carbon dioxide into the second ultrafiltration apparatus;

a third ultrafiltration apparatus configured to subject the second retentate to a third ultrafiltration, wherein the third ultrafiltration yields a third permeate and a third retentate, wherein the third permeate comprises an exosome solution;

a second carbon dioxide injector coupled with the third ultrafiltration apparatus, the second carbon dioxide injector configured to inject carbon dioxide into the third ultrafiltration apparatus; and a drying apparatus configured to dry the third permeate to yield an exosome powder from the exosome solution.

18. The system of claim 17, wherein the first membrane is configured to retain molecules having a molecular weight greater than about 10 kDa.

19. The system of claim 17, wherein the second membrane is configured to retain molecules having a molecular weight greater than about 50 kDa.

20. The system of claim 17, wherein the third membrane is configured to retain molecules having a molecular weight greater than about 100 kDa.

* * * * *